No. 683,089. Patented Sept. 24, 1901.
K. C. WIDEEN.
REDUCING OXIDS OR OTHER METALLIC COMPOUNDS.
(Application filed Jan. 19, 1901.)
(No Model.)
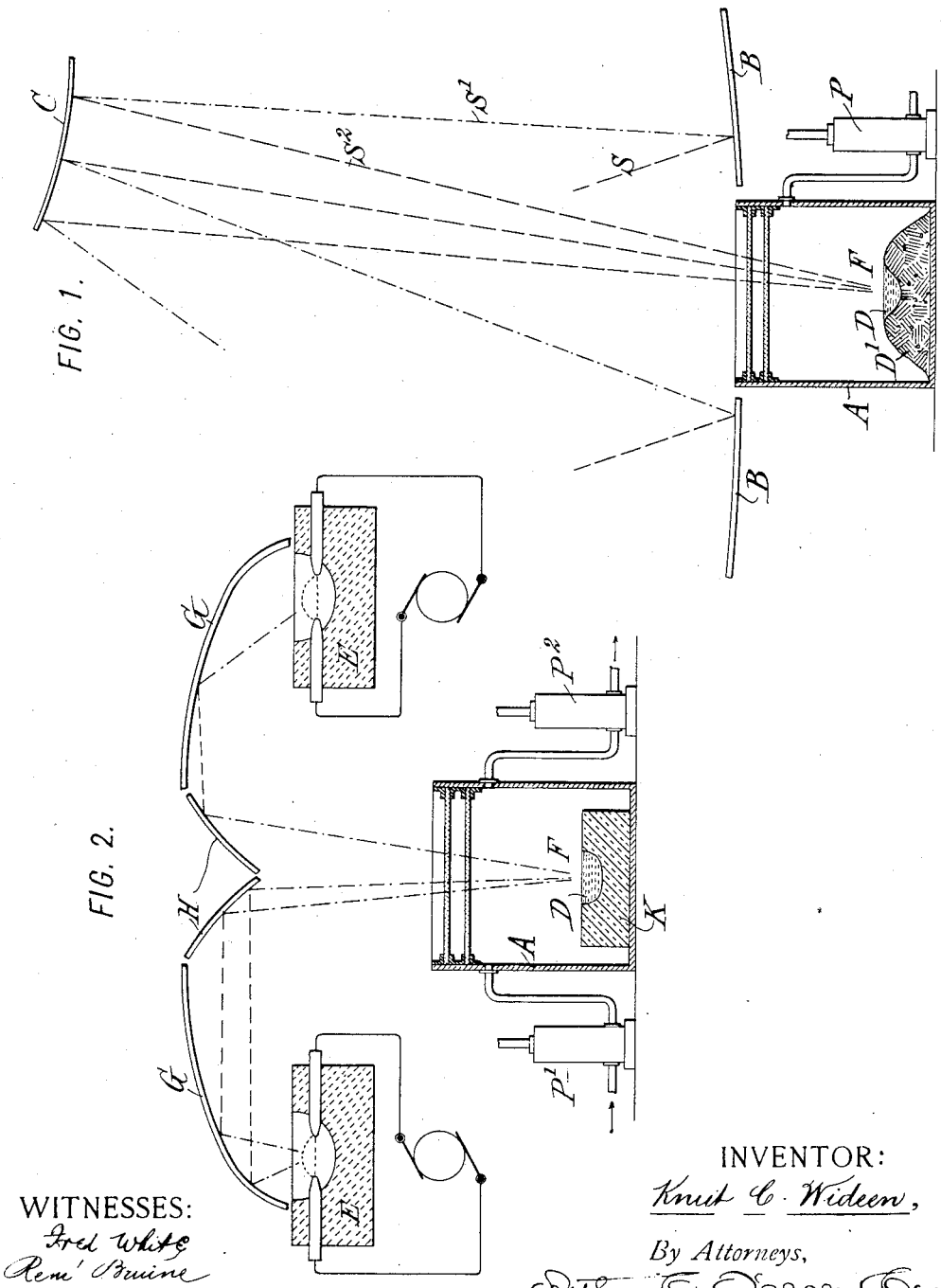

UNITED STATES PATENT OFFICE.

KNUT C. WIDEEN, OF BROOKLYN, NEW YORK.

REDUCING OXIDS OR OTHER METALLIC COMPOUNDS.

SPECIFICATION forming part of Letters Patent No. 683,089, dated September 24, 1901.

Application filed January 19, 1901. Serial No. 43,949. (No specimens.)

*To all whom it may concern:*

Be it known that I, KNUT C. WIDEEN, a subject of the King of Sweden and Norway, residing in the borough of Brooklyn, county of Kings, city and State of New York, have invented certain new and useful Improvements in Reducing Oxids or other Metallic Compounds, of which the following is a specification.

This invention relates to the reducing of compounds of metals or metalloids, and especially to the separation out of their oxids of refractory metals or metalloids—that is, such as have a strong affinity for oxygen—such, for example, as aluminium and silicon.

The invention is also applicable to the reduction of other ores or compounds, such as sulfids or chlorids.

The invention aims to present a process by which practically all the oxygen is separated, so as to leave the metal in a substantially pure state.

The invention aims also to present a process which is extremely simple and rapid and which presents various other advantages, all as will be hereinafter specified.

It has heretofore been thought impossible to separate most metals from combination with oxygen except in the presence of a reducing agent which should liberate and take up the oxygen from the metal by reason of its strong affinity for the same. Where the heat of combination of the reducing agent with oxygen has been greater than that of the metal with oxygen, a certain quantity of heat has been developed by the reaction. Where such heat of combination of the reducing agent has been less than that of the metal, it has been necessary to supply additional heat during the reaction. Therefore, though extraneously-supplied heat has sometimes been necessary and sometimes unnecessary, the presence of a reducing agent has always been thought necessary. The use of a reducing agent, in fact, has been the basis of all prior processes. In the reduction of aluminium-oxid, for example, the high temperature of the electric furnace has been found necessary for the reason that all practical reducing agents develop a much lower combining heat with oxygen than does aluminium, yet the presence of carbon or other reducing agent has always been relied upon primarily, the heat being supplementary to the carbon. Besides reducing agents of the kind stated the action of electrolysis has also been relied on in some processes as a reducing agency. The highest temperature attainable by means of the oxyhydrogen-blowpipe is about 3,700° Fahrenheit. The highest temperature which is practically attainable in the electric furnace is about 7,200° Fahrenheit—the melting-point of the carbon poles. It is well known, however, that higher temperatures may be obtained in other ways. For example, in experiments which have been made with apparatus for collecting and focusing the heat of the sun a temperature of about 10,000° Fahrenheit has been obtained, and it has also been known that by collecting and focusing the heat from several oxyhydrogen flames or from several electric furnaces a much higher temperature is obtained at the focus than at any one of the single sources of heat. In spite of these matters of common knowledge there has been no indication that the heat employed served any other purpose than to assist the reducing agent, and it has been believed that a reducing agent is always necessary to liberate the oxygen and combine with it, so as to prevent its recombining with the metal; but I have discovered that even the metals which are most refractory or difficult of reduction from the oxid by means of the ordinary reducing agents may be isolated by subjecting them to an extremely-high temperature—higher, for example, in some cases, than that of a single electric furnace—without the necessary presence of a reducing agent. The lowest temperature at which my process may be carried out I have not accurately determined. It probably varies for oxids of different metals. I have discovered, however, that there is a certain temperature at which the separation takes place without the necessary presence of a reducing agent and that this temperature is higher than that of the oxyhydrogen flame, and probably higher than that of the electric furnace. In my experiments I have succeeded in reducing alumina and silica to metallic aluminium and silicon at temperatures approximating 10,000° Fahrenheit. It appears, therefore, that the critical temperature for these oxids is between 3,700° and 10,000° Fahrenheit, and probably between 7,200° and 10,000° Fahrenheit. For metals having a higher combining temperature, such as magnesium and calcium, probably a somewhat higher temperature is necessary for reduction, while metals like potassium, sodium, zinc, iron, lead, or copper, which have a lower combining temperature, may be reduced at temperatures below those stated.

In the experiments which I have conducted I have found it advantageous to begin the process with the oxid in a vacuum. I may, in fact, even use a reducing agent—such, for example, as an atmosphere of hydrocarbon gas—to take up the oxygen liberated by the high temperature, the gist of the invention lying in the fact that the temperature used is so high as to alone be able to separate the oxygen from the metal.

By the use of my new process I have succeeded in obtaining some of the rare metals in a purer state than any previously known. I believe that I am the first to isolate pure silicon, all the other examples of so-called metallic silicon in existence containing a considerable quantity of combined oxygen either as a hydrate or oxid, or perhaps in the unitary-atom form of oxygen, (supposing ordinary oxygen to be composed of a dual atom.) The aluminium which I have obtained is 99.23 per cent. pure—a much higher grade than any now commercially obtainable. It contains no carbon, which is the injurious ingredient of the present commercial aluminium.

In order to explain the mechanical details of a process embodying my invention, I will refer to the accompanying drawings, in which—

Figure 1 is a diagrammatic illustration of a solar furnace which I have specially designed for the purpose and which forms the subject of my pending application for patent, Serial No. 14,638, filed April 27, 1900; and Fig. 2 is a diagrammatic illustration of a similar system in which the heat from several electric furnaces is focused in the reducing-furnace.

Referring first to Fig. 1, A is a furnace of the type described specifically in my pending application for patent, Serial No. 14,638.

B represents primary mirrors, which receive rays S from the sun and reflect them to a common secondary mirror C, the reflected rays being indicated by the reference-letter S'. Any number of mirrors B may be provided, the amount of heat collected depending chiefly on the number of mirrors used. From C the converged rays S' are still further converged, as shown at $S^2$, and come to a focus at F—a point in the lower part of the furnace A. At D is shown the molten oxid. Any suitable support is used for the ore which is to be reduced. Where the ore D is alumina, I have supported it on a mound D' of the same material. Only so much of the material as is quite close to the focus F is reduced, and therefore a support of alumina serves the purpose very well. At P is shown a diagram of an air-pump as typical of the means for obtaining a vacuum within the furnace A.

In Fig. 2 the furnace A is of the same construction as in Fig. 1, and the heat for reducing the ore is obtained by reflecting and focusing the heat from any suitable number of electric furnaces E. According to the system indicated the rays are collected by the first set of mirrors G and are converged to the second set of mirrors H, whence they are focused at F within the furnace. The oxid is shown at D and is represented as supported upon a block K of asbestos, which I have also found to work well. The asbestos immediately adjacent to the focus is melted along with the ore, but does not mix with the metallic aluminium, and therefore is entirely suited for use in reducing alumina. The two pumps P' $P^2$ typify any suitable means for maintaining a gaseous reducing agent, such as a hydrocarbon gas under pressure, where it is desired to use the same as an auxiliary to a high temperature. It will be understood that the types of apparatus indicated are not at all essential to my process, but are merely presented in order to show one system of collecting and utilizing heat in the carrying out of my process.

At the beginning of my process, as stated, I prefer to exhaust the atmosphere within the furnace. When the heat has been applied for a very short time, however, the vapors generated produce an extreme pressure within the furnace—perhaps fifty to one hundred atmospheres—which probably prevents the volatilization of the metal, even though the temperature be much above that necessary for volatilization at lower pressures. The volatilization is probably prevented also by the fact that at a distance of only one or two inches from the focus the temperature is below even the fusing-point of the metal. The failure of the metal to recombine with the oxygen may be due to the fact that as the quantity of molten pure metal increases the lower portion of it solidifies, because of its distance from the focus, and is protected at the same time from contact with the oxygen by the upper molten portion of the mass, or it may be that at such high temperatures the constitution of the oxygen is changed—that it is converted into some other form than that with which we are familiar and which form has not the usual strong tendency to combine with the metal. The fact that it dissociates itself from the metal under the given conditions tends to corroborate this theory. However, it will be understood that the theories advanced herein are not stated as proven facts, but only as possible explanations of the results which I have obtained by my process. I do not know positively what are the physical or chemical changes in the substances treated between the time when I put an ore into the furnace and the time when I find pure metal there. In order to collect the metal, I may cut off the heat and find the metal in a solid state at the point where the heat was focused, or I may draw it out of the bottom of the furnace in a solid condition during the process and as fast as it is formed. Though of special usefulness in the reduction of oxids as above specifically described, my process is also applicable to the reduction of other metallic componds—such, for example, as chlorids or sulfids. It will be understood, therefore, that for the purposes of my invention such other compounds are the equivalent of oxids.

I have herein treated silicon as a metal, although I am aware that it is now generally regarded as a metalloid. However, my invention is applicable to metalloids as well as to metals, and for the purposes of this specification the word "metal" may be taken as including such metalloids as are reducible from their compounds by my process.

What I claim, therefore, and desire to secure by Letters Patent, are the following-defined novel features, each substantially as described:

1. The process of reducing oxids which consists in putting them into a furnace and forming a vacuum in said furnace, and then closing the same and submitting the oxids to a temperature greater than that of the oxyhydrogen-blowpipe and which alone is sufficient to separate the oxygen.

2. The process of extracting aluminium from its oxid which consists in putting the oxid into a furnace and forming a vacuum in said furnace, and then closing the same and submitting the oxids to a temperature greater than that of the oxyhydrogen-blowpipe and which alone is sufficient to separate the oxygen.

In witness whereof I have hereunto signed my name in the presence of two subscribing witnesses.

KNUT C. WIDEEN.

Witnesses:
DOMINGO A. USINA,
FRED WHITE.